(12) United States Patent
Fowler et al.

(10) Patent No.: US 7,355,814 B1
(45) Date of Patent: Apr. 8, 2008

(54) DISK TEXTURE LOCATED IN LOAD/UNLOAD ZONE OF DISK FOR CLEANING CONTAMINATION AND DISK LUBRICANT FROM HEAD ABS SURFACE

(75) Inventors: David E. Fowler, San Jose, CA (US); Erhard Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 316 days.

(21) Appl. No.: 11/219,003

(22) Filed: Sep. 1, 2005

Related U.S. Application Data

(60) Provisional application No. 60/606,865, filed on Sep. 2, 2004.

(51) Int. Cl.
*G11B 5/41* (2006.01)
(52) U.S. Cl. .................................... 360/128
(58) Field of Classification Search ............... 360/135, 360/75, 97.01, 237, 128; 428/141
See application file for complete search history.

(56) References Cited

U.S. PATENT DOCUMENTS

| | | | |
|---|---|---|---|
| 4,933,785 A | 6/1990 | Morehouse et al. | |
| 5,351,156 A | 9/1994 | Gregory et al. | |
| 5,612,830 A | 3/1997 | Gregory et al. | |
| 5,729,399 A | 3/1998 | Albrecht et al. | |
| 6,252,742 B1 * | 6/2001 | Kameyama | 360/237 |
| 6,362,452 B1 | 3/2002 | Suzuki et al. | |
| 6,493,184 B1 * | 12/2002 | Smith | 360/135 |
| 6,798,605 B2 * | 9/2004 | Kurita et al. | 360/75 |
| 6,821,653 B2 | 11/2004 | Fukushima et al. | |
| 7,087,290 B2 * | 8/2006 | Feist et al. | 428/141 |
| 7,177,115 B2 * | 2/2007 | Shiroishi | 360/97.01 |
| 2001/0049031 A1 | 12/2001 | Bajorek et al. | |
| 2001/0053444 A1 | 12/2001 | Yokoyama et al. | |
| 2002/0055017 A1 | 5/2002 | Fukushima et al. | |
| 2002/0142707 A1 | 10/2002 | Shimada et al. | |
| 2004/0209470 A1 | 10/2004 | Bajoreck | |
| 2005/0036223 A1 | 2/2005 | Wachenschwanz et al. | |
| 2005/0044695 A1 | 3/2005 | Fong et al. | |
| 2005/0044696 A1 | 3/2005 | Fong et al. | |
| 2005/0052776 A1 | 3/2005 | Xu et al. | |
| 2005/0057857 A1 | 3/2005 | Kawakami et al. | |
| 2005/0063091 A1 | 3/2005 | Kawakami et al. | |
| 2005/0063095 A1 | 3/2005 | Matsumara et al. | |
| 2005/0121839 A1 | 6/2005 | Fukushima et al. | |

OTHER PUBLICATIONS

Hitachi Global Storage Technologies "Hard Disk Drive Load/Unload Technology" at http://www.hitachigst.com/hdd/library/whitepap/load/load.htm 4 pages.

(Continued)

*Primary Examiner*—Tianjie Chen

(57) ABSTRACT

The present invention is directed to a load/unload disk drive that includes:
  a rotational arm engaging a slider;
  a magnetic storage disk, wherein the magnetic head in the slider reads data from and/or writes data to a data zone of the magnetic storage disk; and
  a ramp positioned next to the magnetic storage disk. The magnetic storage disk includes a slider cleaning zone having a roughness greater than a roughness of the data zone. The slider is periodically contacted with the slider cleaning zone to remove particles collected on the slider.

46 Claims, 4 Drawing Sheets

OTHER PUBLICATIONS

Symposium L, Materials for High-Density Magnetic Recording, Apr. 12-16, 1998, at http://lucy.mrs.prg/meetings/spring98/absbook/AbstractBookL.html 22 pages.

Fujitsu HDD User's Guide Glossary at http://www.fujitsu.com/globalsupport/computing/storage/hdd/tips/hdd_tipschap8.html 2 pages.

ip.com Prior Art Database Laser Texture Bump Design at http://www.priorartdatabase.com/IPCOM/000015018/ Mar. 28, 2005, 2 pages.

Melting and Surface Deformation In Pulsed Laser Surface Micromodification of Ni-P Disks, copyright 2000 by ASME, S.C. Chen, D.G. Cahill and C.P. Griporopoulos, Feb. 2000, vol. 122, pp. 107-112.

Hitachi Global Storage Technologies "Hard Disk Drive Load/Unload Technology" at http://www.hitachiqst.com/hdd/library/whitepap/load/load.htm 4 pages, no date.

Fujitsu HDD User's Guide Glossary at http://www.fujitsu.com/globalsupport/computing/storage/hdd/tips/hdd_tipschap8.html 2 pages, no date.

* cited by examiner

DISK TEXTURE LOCATED IN LOAD/UNLOAD ZONE OF DISK FOR CLEANING CONTAMINATION AND DISK LUBRICANT FROM HEAD ABS SURFACE

CROSS REFERENCE TO RELATED APPLICATION

The present application is a continuation-in-part of U.S. Patent Application Ser. No. 60/606,865, filed Sep. 2, 2004, having the same title, to Fowler et al., which is incorporated herein by this reference.

FIELD

The invention relates generally to magnetic storage media and particularly to magnetic storage media in load/unload disk drive configurations.

BACKGROUND

Traditionally, most magnetic disk drives have operated in a Contact Start-Stop (CSS) mode in which heads come to rest on the disk surface when the drive is turned off. During start-up, the heads contact and slide over a Laser Zone Textured (LZT) portion of the disk surface until the disks are spinning sufficiently fast for the slider to fly above the disk surface. The LZT provides a roughened surface that prevents adhesion (or reduces stiction) of the head to the smooth disk surface and removes contaminant and disk lubricant particles from the Air Bearing Surface or ABS of the slider (which includes the Giant MagnetoResistive or GMR head). The ABS typically includes the trailing center pad and other minimum slider-to-disk clearance pads. Particle buildup on the ABS can create potential performance degradation of the GMR head, causing the head to roll or otherwise have an improper height above the disk surface. An improper flying height can lead to unacceptable read/write error rates. The landing zone does not contain data and is used solely for slider starting and stopping cycles.

Load/unload disk drives have become an attractive alternative to CSS disk drives. Compared to CSS disk drives, load/unload drives provide benefits including increased areal density for higher capacity, improved shock resistance for greater disk durability and longevity, and reduced power consumption for cost savings. A conventional load/unload design is shown in FIG. 1. The disk drive 100 includes a magnetic disk 104, a rotary actuator arm 108 mounting a flexible suspension arm 112 and a slider 116. A tab 112 extends from the flexible suspension arm 112 for engaging a ramp 120 when the rotary arm 108 is moved to a rest or parked position, such as at power-down. The ramp 120 is an inclined cam-like surface, commonly positioned at the disk outer diameter. The tab 112 causes the arm 108 to ride upwards in response to the incline of the ramp until the tab 112 is parked at a detent 124 located at the parked position. The head is returned to the disk 104 only after a sufficient rotation rate has been reached on the next start-up cycle to permit the slider to fly above the disk surface. In this disk drive design unlike CSS disk drives, head-to-disk contact (and any other head-to-disk interaction) is drastically reduced, thereby virtually eliminating disk and/or head damage.

However, intermittent head-to-disk contact can cause disk lubricant and other contaminant particles to buildup on the head, causing impaired drive performance. In the load/unload design, there is no regular or controlled contact between the ABS surface of the slider and the disk to remove the particulates accumulated on the slider/head as may occur in a CSS design. To address this problem, one load/unload disk drive design placed a cleaning brush in an off-disk position. After the tab has contacted the ramp and as the tab is moving up the ramp incline, the brush contacts and cleans the slider/head. The brush thus effects head cleaning during each power-down and power-up cycle. Although this design did provide some particulate removal, cleaning occurred infrequently during power-down and power-up cycles. The cleaning was also of limited effectiveness because the cleaning action was in a cross-track direction and loading pressure of the head on the brush was low.

SUMMARY

These and other needs are addressed by the various embodiments and configurations of the present invention.

The present invention is directed to the use of a roughened cleaning zone on the magnetic disk to effect periodic cleaning of the ABS of the slider. The cleaning zone, which is preferably a Laser Zone Texture or LZT region, is configured to physically contact the slider during disk rotation (which is preferably at normal disk rotational velocities, although not required) and thereby remove collected particles, such as lubricant particles, from the slider. Thus, the heights of the raised subregions (e.g., bumps) in the cleaning zone are preferably at a height just below, at, or higher than the normal minimum disk clearance. As will be appreciated, the subregion shape, height, width, spacing, and number are selected to provide effective cleaning of the slider without introducing an undesirable degree of overcoat wear of either the magnetic disk or slider.

The cleaning zone may be located in any area of the disk that is contactable by the slider during disk drive operation. In the preferred configuration, the cleaning zone is positioned in the load/unload radial transition zone next to the ramp so that each load/unload cycle induces controlled contact which would clean the ABS surfaces. As will be appreciated, the ramp may be located at the inner or outer diameter of the disk. For each load and unload cycle, the slider preferably is maintained in contact with the cleaning zone for a predetermined time sufficient for the desired degree of particle removal. The predetermined time is controlled by the load and unload speed of the slider. In one configuration, the cleaning zone is discontinuous and is formed by a number of discrete subzones or subregions distributed at selected locations on the disk. For example, one or more subzones can be located in the outer diameter area of the disk. Movement of the slider to and/or from the ramp may be synchronized with disk rotation so that the slider contacts or does not contact the subzones. Additionally, at any point during disk drive operation the slider may be moved to the cleaning zone for cleaning without the movement being part of a load/unload cycle. In other words, cleaning can occur as frequently as desired. The cleaning can be highly effective because the cleaning action is not in a cross-track direction but in the direction of the tracks and loading pressure of the head on the raised areas of the cleaning zone can be high (depending of course on the height of the raised areas and the flying height, which can be adjusted through the rotational velocity of the disk). As the slider-to-disk clearance becomes ever smaller, the probability of the slider becoming contaminated with environmental materials and/or disk lubricant is increasing. The disk drive configuration of the present invention can offer an inexpensive, simple, and efficient way to clean contamination from the slider.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one . . . and," "at least one . . . or," "one or more of . . . and," "one or more of . . . or," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, and A, B and C together.

DETAILED DESCRIPTION

Figure 1:
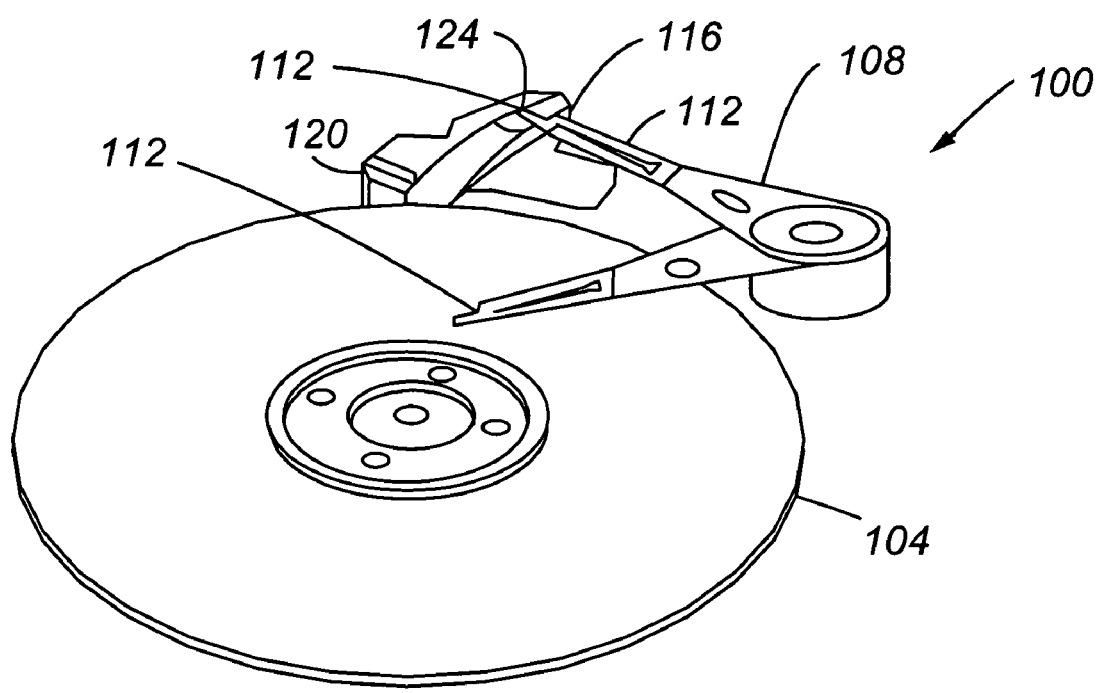
FIG. 1 is a perspective view of a prior art load/unload disk drive.
Figure 2:
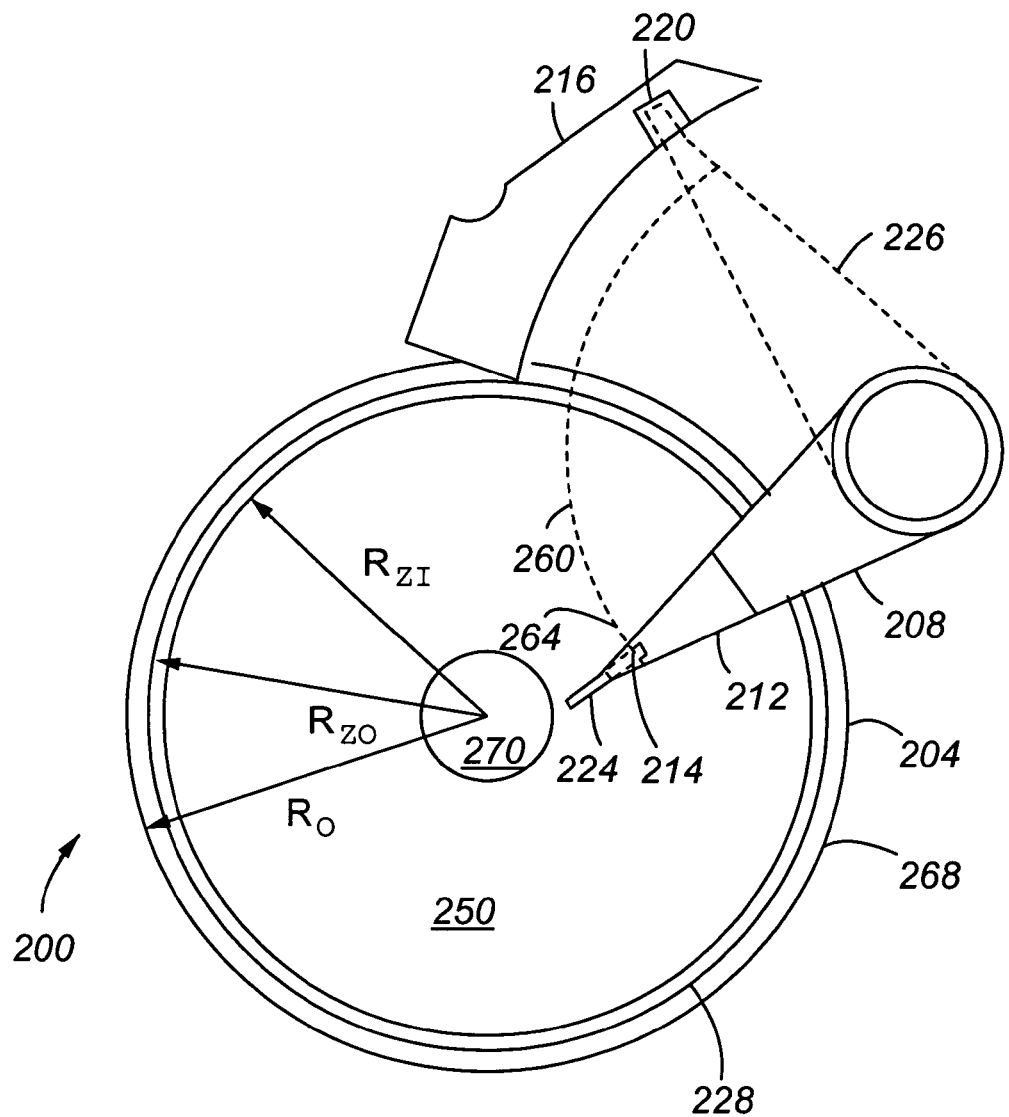
FIG. 2 is a plan view of a load/unload disk drive according to an embodiment of the present invention.

A load/unload disk drive of a first embodiment of the present invention is shown in FIG. 2. Referring to FIG. 2, the disk drive 200 includes a magnetic disk 204, an inclined ramp 216, and a rotary actuator arm 208 mounting a flexible suspension arm 212 and slider 214. The suspension arm 212 includes a projecting tab 224 for engaging the ramp 216 during load/unload cycles. The ramp 216 includes a detent 220 for parking the tab as shown by the dotted lines 224, which represent the rotary actuator arm 208 in the (fully) parked position. As can be seen from the dotted lines 224, the slider 214 is positioned off and to the side of the disk 204 when the arm 208 is in the (fully) parked position. As can be further seen from FIG. 2, the head in the rotary actuator arm 208 has a range of rotation 260. The range of rotation 260 covers a radial extent of the disk (or the various tracks located at the disk periphery 268 to the limit 264 of the range 260 near the disk hub assembly 270).

The outer periphery of the disk 204 includes a roughened cleaning zone 228 for intermittent contact with and cleaning of the ABS of the slider 214. The cleaning zone 228 is preferably located in the transition zone of the load and unload operations. The ABS of the slider 214 (or the air-bearing flats and center pad and particularly the trailing portions or ends of these raised areas on the slider) can be contacted with the roughened surface of the cleaning zone 228 during load/unload cycles and/or as frequently as desired during disk drive operation. The cleaning zone 228 is typically located in a data-free zone (or exteriorly of the read/write tracks of the disk).

The width of the zone 204 (or the distance between the inner zone radius $R_{ZI}$ and outer zone radius $R_{ZO}$) depends on the application. Typically, the width (or the difference between $R_{ZI}$ and $R_{ZO}$) is at least about 0.3 mm and more typically ranges from about 1 slider width to about 3 slider widths (with the common width of a disk track ranging from about 0.05 to about 0.25 microns). The surface roughness of the cleaning zone is typically at least about 1.0 nm and more typically ranges from about 4.0 nm to about 15 nm. Stated another way, the roughness is at least about 500%, and even more preferably, at least about 10,000% of the roughness of the information-containing zone 250. In a typical load/unload design, $R_{ZI}$ is typically from about $R_O$-3.0 mm to about $R_O$-2.5 mm, while $R_{ZO}$ is from about $R_O$-1.5 mm to about $R_O$-0.5 mm. By way of example, in a 95 mm diameter form factor disk, the cleaning zone 228 could be located between 44.5 mm and 46.75 mm.

Figure 3:
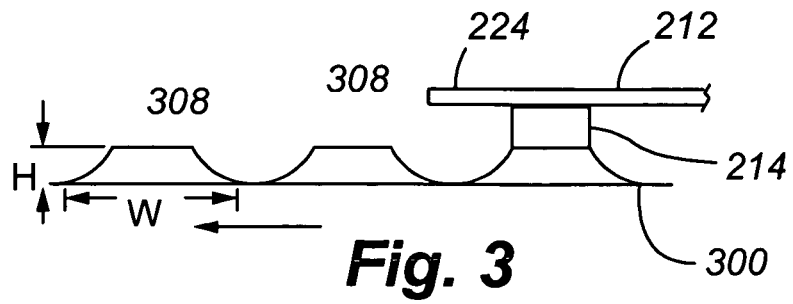
FIG. 3 is an exploded side view of the raised areas in the cleaning zone according to another embodiment of the present invention.
Figure 4:
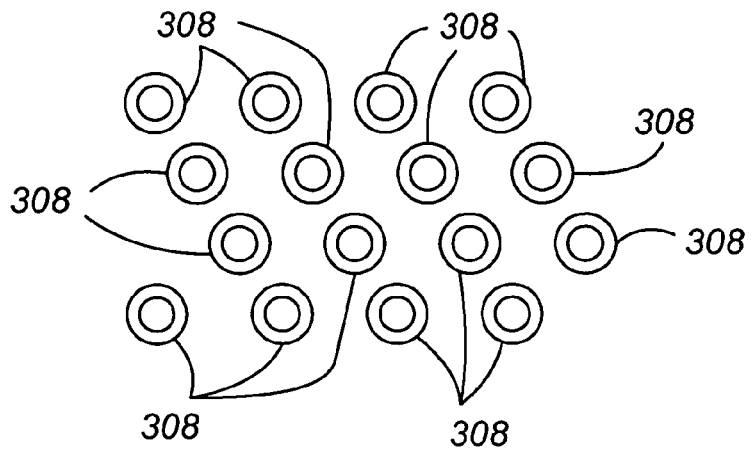
FIG. 4 is an exploded plan view of the raised areas in the cleaning zone according to the embodiment of FIG. 3.

FIGS. 3 and 4 depict a preferred configuration of the cleaning zone 228. The cleaning zone 228 includes a plurality of bumps having an average or maximum height "H" and an average diameter "W". As can be seen in FIG. 3, when the head 214 passes over the bumps 308, the ABS of the head/slider contacts the bumps and the friction between the head/slider and bump effectively removes contaminant particles from the ABS of the head/slider. The bump height "H" depends on a number of factors including the flying height of the slider 214 (which is a function of the disk rotational speed) and the wear resistance of the slider and/or overcoat layer. As will be appreciated, if the height "H" is too high wear patterns will form on the ABS overcoat and/or disk overcoat layer, and if the height "H" is too low an inadequate degree of contact for cleaning will occur between the ABS and bumps. Preferably, the height "H" of at least most of the bumps (and typically at least about 90% of the bumps) ranges from about 100 to about 300% of the head flying height, even more preferably from about 125 to about 200% of the head flying height, and even more preferably from about 125 to about 175% of the head flying height. As will be appreciated, the head flying height refers to the minimum distance between any point on the head/slider and the disk surface 300 (which point is typically at the rear of the head/slider). In a typical application where the disk is at least about 75% of full rotational speed when contact between the bumps and slider occurs, the height "H" will range from about 4 nanometers to about 20 nanometers and more typically from about 7 to about 15 nanometers. The diameter "W" of the bumps 308 will typically be at least about 4 micrometers and more typically range from about 5 to about 12 micrometers.

Any bump density or distribution may be employed. In a preferred distribution, the center-to-center spacing of the bumps 308 preferably ranges from about 5 to about 50 microns, more preferably from about 7 to about 30 microns, and even more preferably from about 15 to about 25 microns. This provides a bump density preferably ranging from about 40,000 to about 400 bumps/mm², more preferably from about 20,400 to about 1,100 bumps/mm², and even more preferably from about 4,500 to about 1,600 bumps/mm².

Likewise, though the bumps 308 are shown in FIG. 4 as being in an offset grid pattern, any bump pattern may be employed, such as a spiral pattern or grid pattern. As will be appreciated, any common bump pattern used in LZT texturing is usable in the present invention.

Although the bumps 308 are shown as being in a crater configuration, any configuration may be used, such as "ridge-shape," "sombrero-shape," "dome-shape," and "plateau-shape." A crater or plateau configuration is preferred to reduce the likelihood of wear patterns forming on the slider and increase the cleaning efficiency of slider-to-bump contact.

The bumps may be formed by any suitable technique, including without limitation LZT techniques, etching techniques (in which an etchant is randomly distributed over the cleaning zone to create bumps), masking techniques (in which the cleaning zone is partially masked and either bump material deposited on the unmasked areas or etchant is contacted with the unmasked areas), abrasion techniques (in which an abrasive material is contacted with the cleaning zone while the disk is rotated), sandblasting techniques (in which the cleaning zone only is sandblasted), tape transfer techniques (in which tape with a particulate material embedded on it is contacted with the cleaning zone), embedded particles, and other types of scrubbing texture techniques. The preferred technique is laser zone texturing after plating and polishing using conventional LZT formation techniques. Laser zone texturing typically involves the use of a pulsed laser to irradiate the disk surface, which causes surface melting and resolidification to precisely control the surface topology. During laser pulsing, the disk is rotated at a desired constant or varied velocity (such as about 2500 to about 8000 RPM) to provide the desired bump distribution (or inter-bump spacing). As will be appreciated, the disk substrate is typically aluminum or glass that is plated with a NiP alloy. An underlayer (e.g., Cr or NiP), a magnetic Co alloy layer (or a series of magnetic and nonmagnetic layers), and a protective overcoat layer (e.g., zirconia, silicon nitride, or amorphous carbon) are sputtered in that order onto the LZT textured disk. The lubricant is applied to the protective overcoat layer.

In operation, when the disk drive 200 is powered up the rotary actuator arm 208 is moved from the fully parked position and rotated toward the disk. The tab 224 contacts the ramp, causing the height of the slider above the disk surface 300 to decrease with decreasing radial distance of the arm from the disk periphery. By the time that the slider is above the cleaning zone 228 of the disk, the disk is typically at least about 75% of the full disk rotational speed. Before the rotary actuator arm is further rotated away from the cleaning zone 228 to the read/write zone 250 of the disk, the arm is held for a predetermined time in the cleaning zone 228 (or in a cleaning position) to maintain the ABS surface of the slider in contact with the bumps 308 for the predetermined time. The predetermined time is sufficient for most, if not all, of the contaminant particles to be removed from the ABS and is therefore a function of the disk rotational speed and the contact force between the ABS and the cleaning texture. The predetermined time typically ranges from about 0.1 of a revolution to about 300 revolutions of the disk. As will be appreciated, the cleaning may alternatively or additionally occur immediately prior to contact of the tab 224 with the ramp 216 in a power-down or unloading cycle and/or at any time during disk operation. During the cleaning operation, the rotational rate of the disk may be slowed to decrease the flying height before the slider is moved onto the cleaning zone 228. The slowed rotational rate and lower flying height permits a lower bump height to be employed. This method allows more control of when the cleaning operation is done.

To avoid disk drive overheating and to substantially minimize the possibility of head element damage during the cleaning cycle, the head elements, including any auxiliary heaters or drivers are preferably not powered with a predetermined time before and after and during cleaning. When cleaning occurs as part of the load and/or unload cycles, the head elements are not powered during the cycles. The predetermined time typically ranges from about 10 μtsec to about 10 msec.

Figure 5:
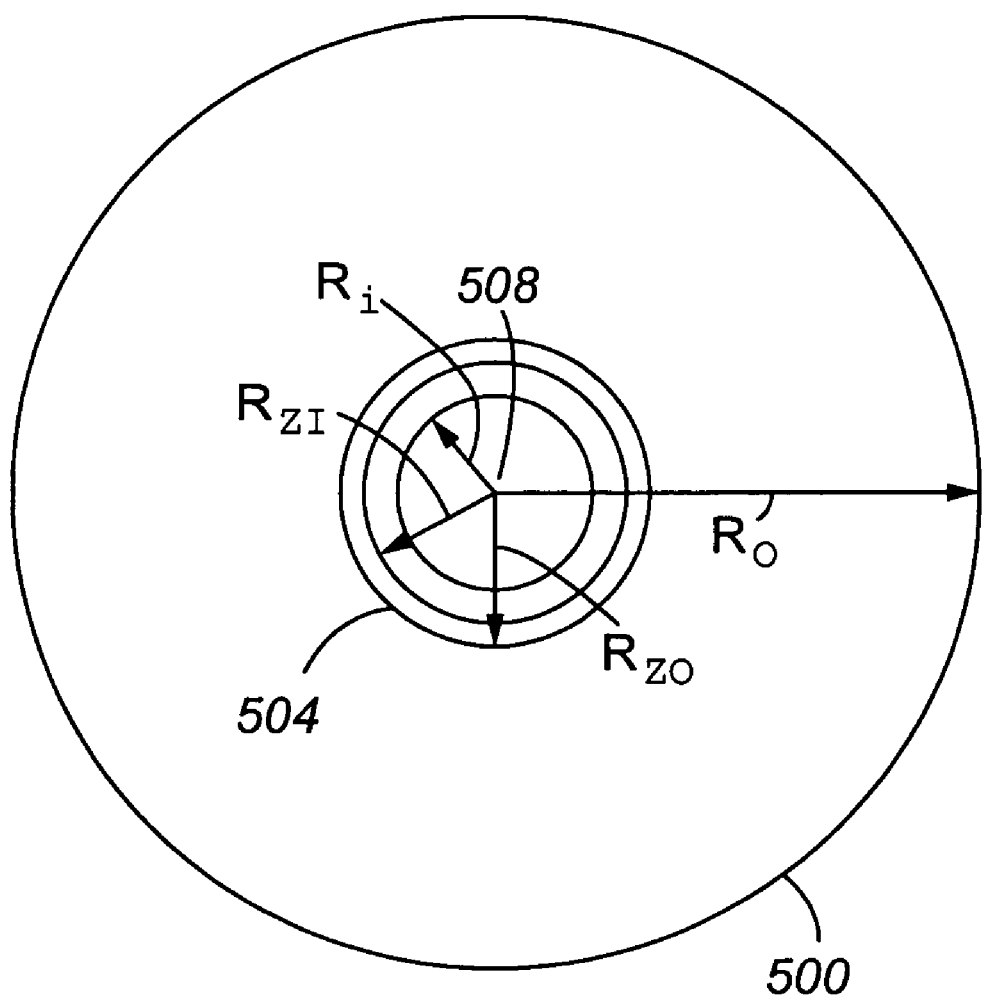
FIG. 5 is a plan view of magnetic disk according to another embodiment of the present invention.

Although the cleaning zone 228 is shown at the outer disk periphery positioned outside of the data containing (or read/write) portion of the disk, the zone 228 may be located anywhere on the disk, including at the inner periphery and in the data-containing central portion of the disk. A load/unload disk drive configuration with the cleaning zone and ramp at the inner disk periphery is shown in FIG. 5. In the disk 500 of FIG. 5, the cleaning zone 504 is located near the disk hub assembly 508 (where the load/unload ramp (not shown) is positioned). The cleaning zone 504 is positioned in a data-free zone (or interiorly of the read/write tracks of the disk). In this disk drive configuration, $R_{ZI}$ is typically from about $R_i+0.5$ mm to about $R_i+5$ mm, while $R_{ZO}$ is from about $R_i+0.8$ mm to about $R_i+8$ mm of the outer disk radius $R_O$. By way of example, in a 95 mm form factor disk, the cleaning zone 504 could be located between 19.0 mm and 21.5 mm.

The cleaning zone is not required to extend around the entire circumference of the disk. The cleaning zone can be located in one or more discrete areas of the disk. For example, the cleaning zone may be located only in the vicinity of the load/unload ramp 216. In this configuration, cleaning occurs necessarily as part of the load and/or unload cycles. The cleaning zone may be located in an area of the outer or inner periphery of the disk that is distant from the ramp 216. In this configuration, cleaning does not occur necessarily as part of the load and/or unload cycles. The cleaning zone may be located in a number of discrete disk regions distributed in the outer and/or inner diameter disk areas as an interrupted cleaning zone configuration.

Figure 6:
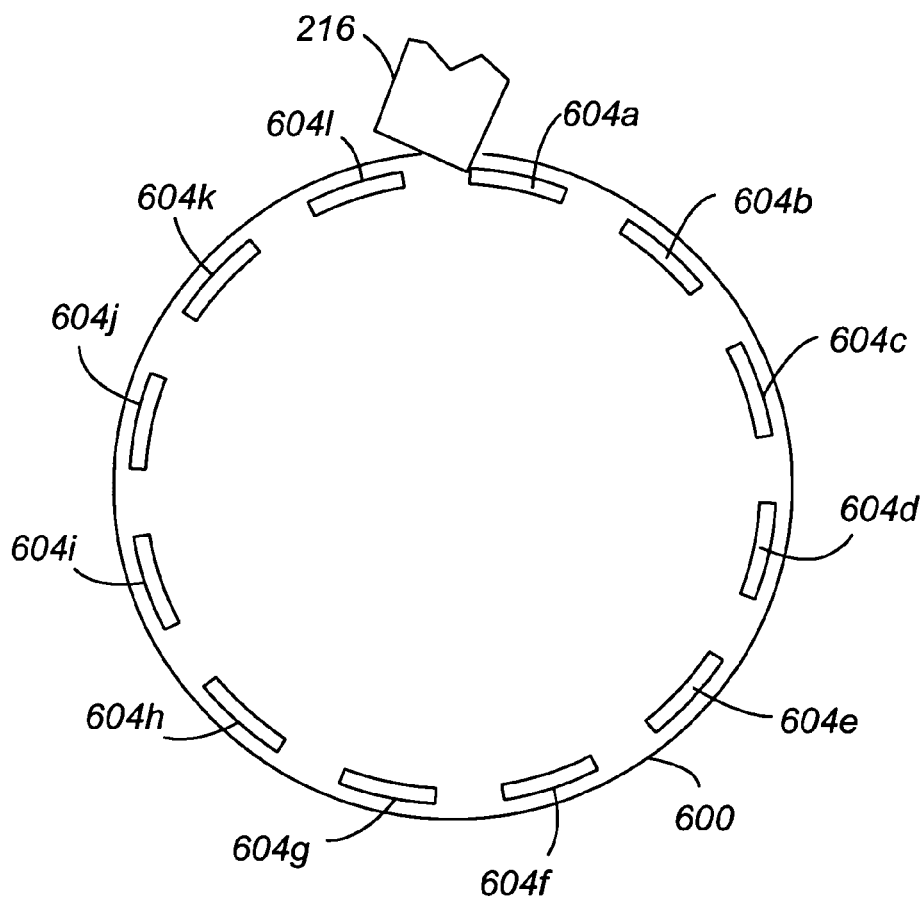
FIG. 6 is a plan view of a disk drive according to another embodiment of the present invention.

The interrupted or circumferentially discontinuous zone configuration is shown in FIG. 6. The interrupted cleaning zone is formed by any number of discrete cleaning subzones 604a-l of the disk 600. Although twelve subzones are depicted, more or fewer subzones may be employed. The bumps in the various subzones may have differing configurations (i.e., heights, widths, spacings, and/or shapes) to provide differing degrees of cleaning. For example, higher and larger bumps can be used for less frequent and more rigorous cleaning while shorter and smaller bumps can be used for more frequent and less rigorous cleaning. In any of the subzone distributions, the bump height can be shorter so that cleaning only occurs when the disk rotational speed is slowed. This would permit the disk drive to clean only as desired and not necessarily during load and unload cycles. Where differing bump heights are used, the bump heights of at least most of the shorter bumps are typically no more than about 20% of the height of at least most of the taller bumps. The intermittent distribution of subzones would allow the disk drive to pass the slider between the subzones during load and unload cycles when cleaning is not desired or over a subzone when cleaning is desired. In other words, when the subzones are spaced a sufficient distance apart the movement of the slider may be synchronized with the disk rotational rate and bump location to selectively bypass or contact the subzone(s).

A number of variations and modifications of the invention can be used. It would be possible to provide for some features of the invention without providing others.

For example in one alternative embodiment, the LZT bump configuration and distribution pattern is not limited to those currently used in CSS disk drives. The pattern could be looser (and more open) or tighter (and more closed). In fact, the use of the textured area only for cleaning and not for stiction prevention permits much more freedom in designing the bump configuration and distribution pattern to optimize cleaning efficiency. In a CSS design, the bump configuration and distribution pattern are selected to optimize stiction prevention with cleaning being an incidental byproduct of the use of the LZT area.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A load/unload disk drive, comprising:
   a rotational arm engaging a slider, the slider comprising a magnetic head, wherein the magnetic head has a range of rotation and wherein the range of rotation covers a radial extent of the disk;
   a magnetic storage disk, wherein the magnetic head is operable to read data from and/or write data to a data zone of the magnetic storage disk, the data zone being in the radial extent of the disk; and
   a ramp positioned next to the magnetic storage disk, wherein, in a first operational mode, a portion of the rotational arm movably engages the ramp and, in a second operational mode, the rotational arm rotates independently of the ramp, wherein the magnetic storage disk comprises a slider cleaning zone located in the radial extent of the disk, the slider cleaning zone having a roughness greater than a roughness of the data zone, whereby at least a portion of the slider is contacted with the slider cleaning zone to remove particles collected on the slider, and wherein the slider cleaning zone comprises a plurality of raised subregions, each of the subregions being elevated relative to the data zone of the disk, and wherein a center-to-center spacing between at least most of the adjacent subregions ranges from about 5 to about 50 microns.

2. The load/unload disk drive of claim 1, wherein the slider cleaning zone is located at an outer radius of the disk in a transition zone for the first operational mode.

3. The load/unload disk drive of claim 1, wherein the slider cleaning zone is located in a data-free zone of the disk, wherein the slider cleaning zone is discontinuous, wherein the slider, in a noncleaning mode, rotationally passes through the cleaning zone discontinuities but not the cleaning zone, and wherein the slider, in a cleaning mode, passes through the cleaning zone.

4. The load/unload disk drive of claim 1, wherein the width of the slider cleaning zone is at least about 0.15 mm.

5. The load/unload disk drive of claim 4, wherein the width of the slider cleaning zone ranges from about 10% of a width of a slider to about 300% of the slider width.

6. The load/unload disk drive of claim 1, wherein a roughness of the slider cleaning zone is at least about 1.0 nm.

7. The load/unload disk drive of claim 1, wherein the slider cleaning zone is located between first and second radial positions relative to a center of the disk, wherein the first radial position is from about 3 mm less than an outer disk radius to about 2.5 mm less than the outer disk radius, and wherein the second radial position is from about 1.5 mm less than the outer disk radius to about the outer disk radius.

8. The load/unload disk drive of claim 1, wherein the slider cleaning zone comprises at least one raised subregion, the subregion being elevated relative to the data zone of the disk, wherein the at least one raised subregion has a height above the data zone, wherein the height ranges from about 100 to about 300% of a flying height of the slider at a disk rotation rate selected for slider cleaning.

9. The load/unload disk drive of claim 1, wherein the slider cleaning zone comprises a plurality of raised subregions, each of the subregions being elevated relative to the data zone of the disk, and wherein the height of at least most of the subregions relative to the data zone ranges from about 5 to about 20 nanometers.

10. The load/unload disk drive of claim 1, wherein the slider cleaning zone comprises a plurality of raised subregions, each of the subregions being elevated relative to the data zone of the disk, and wherein the plurality of raised subregions have a density ranging from about 400 to about 40,000 raised subregions/mm$^2$.

11. The load/unload disk drive of claim 1, wherein the slider cleaning zone comprises a plurality of raised subregions, each of the subregions being elevated relative to the data zone of the disk, and wherein the raised subregions each have at least one of a ridge shape, a sombrero shape, a crater shape, a dome shape and a plateau shape.

12. The load/unload disk drive of claim 1, wherein the cleaning zone comprises a plurality of spaced apart, discrete cleaning subzones.

13. The disk drive of claim 1, wherein the rotational arm is operable to maintain the slider in contact with the cleaning zone for a predetermined time ranging from about 0.1 of a disk revolution to about 300 disk revolutions.

14. A method for operating a disk drive, comprising:
    rotating a rotational arm from a parked position on a ramp to a position above a rotating magnetic storage disk, the rotational arm comprising a slider, the slider including a magnetic head operable to read data from and/or write data to a data zone of the magnetic storage disk; and while the rotational arm is positioned above the magnetic storage disk, contacting at least a portion of the slider with a cleaning zone of the storage disk, wherein the cleaning zone has a roughness greater than a roughness of the data zone, wherein, in the contacting step, the slider is maintained in contact with the cleaning zone for at least one of about 1 msec and about 0.1 of a disk revolution.

15. The method of claim 14, wherein the slider cleaning zone is located at an outer radius of the disk in a transition zone for the first operational mode.

16. The method of claim 14, wherein the cleaning zone is located at an inner radius of the disk.

17. The method of claim 14, wherein the cleaning zone is located in a data-free zone of the disk, wherein the slider cleaning zone is discontinuous, wherein the slider, in a noncleaning mode, rotationally passes through the cleaning zone discontinuities but not the cleaning zone, and wherein the slider, in a cleaning mode, passes through the cleaning zone.

18. The method of claim 14, wherein the width of the cleaning zone is at least about 10% of the slider width.

19. The method of claim 14, wherein the width of the cleaning zone ranges from about 10% to about 300% of the slider width.

20. The method of claim 14, wherein a roughness of the cleaning zone is at least about 1 nm.

21. The method of claim 14, wherein the cleaning zone is located between first and second radial positions relative to a center of the disk, wherein the first radial position is from about 3 mm less than the outer disk radius to about 2.5 mm less than the outer disk radius, and wherein the second radial position is from about 1.5 mm less than the outer disk radius to about the outer disk radius.

22. The method of claim 14, wherein the cleaning zone is located between first and second radial positions relative to a center of the disk, wherein the first radial position is from about $R_i+0.5$ mm to about $R_i+5$ mm, and wherein the second radial position is from about $R_i+0.8$ mm to about $R_i+8$ mm, where $R_i$ is the inner disk radius, and wherein, in all cases, the slider must be able to access the radii of the cleaning zone through the normal rotational motion of the drive design.

23. The method of claim 14, wherein the cleaning zone comprises at least one raised subregion, the subregion being elevated relative to the data zone of the disk, wherein the at least one raised subregion has a height above the data zone, wherein the height ranges from about 100 to about 300% of a flying height of the slider at a disk rotation rate selected for slider cleaning.

24. The method of claim 14, wherein the cleaning zone comprises a plurality of raised subregions, each of the subregions being elevated relative to the data zone of the disk, and wherein the height of at least most of the subregions relative to the data zone ranges from about 5 to about 20 nanometers.

25. The method of claim 14, wherein the cleaning zone comprises a plurality of raised subregions, each of the subregions being elevated relative to the data zone of the disk, and wherein a center-to-center spacing between at least most of the adjacent subregions ranges from about 5 to about 50 microns.

26. The method of claim 14, wherein the cleaning zone comprises a plurality of raised subregions, each of the subregions being elevated relative to the data zone of the disk, and wherein the plurality of raised subregions have a density ranging from about 40,000 to about 400 raised subregions/mm$^2$.

27. The method of claim 14, wherein the cleaning zone comprises a plurality of raised subregions, each of the subregions being elevated relative to the data zone of the disk, and wherein the raised subregions each have at least one of a ridge shape, a sombrero shape, a crater shape, a dome shape and a plateau shape.

28. The method of claim 14, wherein the disk comprises a plurality of spaced apart, discrete cleaning zones.

29. The method of claim 14, wherein the cleaning zone comprises a plurality of bumps, wherein a first set of the plurality of bumps have a first height, wherein a second set of the plurality of bumps have a second height, and wherein the first height is no more than about 20% of the second height.

30. The method of claim 14, wherein the contacting step comprises the substep of:
    maintaining the slider in contact with the cleaning zone for at least about 1 msec.

31. The method of claim 14, wherein a head element of the slider is not powered for a predetermined time at least one of immediately before, immediately after, and during contact of the portion of the slider with the cleaning zone and wherein the predetermined time ranges from about 10 μsec to about 10 msec.

32. A method of manufacturing a disk drive, comprising:
    (a) forming a roughened slider cleaning zone on a magnetic disk, wherein the slider cleaning zone comprises a plurality of raised subregions, each of the subregions being elevated relative to the data zone of the disk, and wherein the plurality of raised subregions have a density ranging from about 40,000 to about 400 raised subregions/mm$^2$;
    (b) forming a magnetic storage layer on the magnetic disk;
    (c) mounting the magnetic disk in a load/unload disk drive, the disk drive comprising:
        (i) a rotational arm engaging a slider, the slider comprising a magnetic head, wherein the magnetic head has a range of rotation and wherein the range of rotation covers a radial extent of the disk;
        (ii) a magnetic storage disk, wherein the magnetic head is operable to read data from and/or write data to a data zone of the magnetic storage disk, the data zone being in the radial extent of the disk; and
        (iii) a ramp positioned next to the magnetic storage disk, wherein, in a first operational mode, a portion of the rotational arm movably engages the ramp and, in a second operational mode, the rotational arm rotates independently of the ramp, wherein the slider cleaning zone is located in the radial extent of the disk, the slider cleaning zone having a roughness greater than a roughness of the data zone, whereby at least a portion of the slider is contacted with the slider cleaning zone to remove particles collected on the slider.

33. The method of claim 32, wherein the roughening step (a) comprises:
    after plating and polishing of a disk substrate, laser texturing the disk substrate to form the cleaning zone having a plurality of raised areas.

34. The method of claim 32, wherein the slider cleaning zone is located at an outer radius of the disk in a transition zone for the first operational mode.

35. The method of claim 32, wherein the slider cleaning zone is located at an inner radius of the disk.

36. The method of claim 32, wherein the slider cleaning zone is located in a data-free zone of the disk.

37. The method of claim 32, wherein the width of the slider cleaning zone is at least about 10% of the slider width.

38. The method of claim 37, wherein the width of the slider cleaning zone ranges from about 100% to about 300% of the slider width.

39. The method of claim 32, wherein a roughness of the slider cleaning zone is at least about 1 nm.

40. The method of claim 32, wherein the slider cleaning zone is located between first and second radial positions relative to a center of the disk, wherein the first radial position is from about $R_O$-3 mm to about $R_O$-2.5 mm wherein the second radial position is from about $R_O$-1.5 mm to about $R_O$, and wherein $R_O$ is the outer disk radius.

41. The method of claim 32, wherein the slider cleaning zone comprises at least one raised subregion, the subregion being elevated relative to the data zone of the disk, wherein the at least one raised subregion has a height above the data zone, wherein the height ranges from about 100 to about 300% of a flying height of the slider at a disk rotation rate selected for slider cleaning.

42. The method of claim 32, wherein the slider cleaning zone comprises a plurality of raised subregions, each of the subregions being elevated relative to the data zone of the disk, and wherein the height of at least most of the subregions relative to the data zone ranges from about 5 to about 20 nanometers.

43. The method of claim 32, wherein the slider cleaning zone comprises a plurality of raised subregions, each of the subregions being elevated relative to the data zone of the disk, and wherein a center-to-center spacing between at least most of the adjacent subregions ranges from about 5 to about 50 microns.

44. The method of claim 32, wherein the slider cleaning zone comprises a plurality of raised subregions, each of the subregions being elevated relative to the data zone of the disk, and wherein the raised subregions each have at least one of a ridge shape, a sombrero shape, a crater shape, and a plateau shape.

45. The method of claim 32, wherein the cleaning zone comprises a plurality of spaced apart, discrete cleaning subzones.

46. The method of claim 32, wherein the rotational arm is operable to maintain the slider in contact with the cleaning zone for a predetermined time ranging from about 0.1 of a disk revolution to about 300 disk revolutions.

* * * * *